(12) United States Patent
Chen et al.

(10) Patent No.: US 11,489,251 B2
(45) Date of Patent: Nov. 1, 2022

(54) HIGH-FREQUENCY OSCILLATOR ASSEMBLY AND BASE STATION ANTENNA

(71) Applicant: Kunshan Luxshare RF Technology Co., Ltd., Suzhou (CN)

(72) Inventors: Lu Chen, Suzhou (CN); ChengYu Xu, Suzhou (CN); ZhenHua Li, Suzhou (CN); ZheXuan Xu, Suzhou (CN); WanQiang Zhang, Suzhou (CN); MengYun Gu, Suzhou (CN); WenKai Xu, Suzhou (CN)

(73) Assignee: KUNSHAN LUXSHARE RF TECHNOLOGY CO., LTD., Suzhou (CN)

( * ) Notice: Subject to any disclaimer, the term of this patent is extended or adjusted under 35 U.S.C. 154(b) by 63 days.

(21) Appl. No.: 17/244,386

(22) Filed: Apr. 29, 2021

(65) Prior Publication Data

US 2022/0037779 A1 Feb. 3, 2022

(30) Foreign Application Priority Data

Jul. 28, 2020 (CN) .......................... 202021519971.4

(51) Int. Cl.
*H04B 1/04* (2006.01)
*H01Q 21/26* (2006.01)
(Continued)

(52) U.S. Cl.
CPC ............... *H01Q 1/50* (2013.01); *H01Q 1/246* (2013.01); *H01Q 15/14* (2013.01); *H04W 88/08* (2013.01)

(58) Field of Classification Search
CPC .......... H01Q 1/50; H01Q 1/246; H01Q 15/14; H01Q 1/523; H01Q 5/42; H01Q 21/26;
(Continued)

(56) References Cited

U.S. PATENT DOCUMENTS 6,313,809 B1 * 11/2001 Gabriel ............... H01Q 21/062
343/797
2007/0290766 A1 * 12/2007 Kim ....................... H03H 7/422
333/26
(Continued)

FOREIGN PATENT DOCUMENTS

CN WO2017035726 A1 * 3/2017 ............ H01Q 21/24
CN 206259489 U 6/2017
(Continued)

*Primary Examiner* — Andrew Wendell
(74) *Attorney, Agent, or Firm* — Birch, Stewart, Kolasch & Birch, LLP

(57) ABSTRACT

The present disclosure provides a high-frequency oscillator assembly and a base station antenna. The high-frequency oscillator assembly comprises a balun supporting component and a baseplate. The balun supporting component comprises two balun supporting plates. The balun supporting plate comprises a first surface and a second surface. The first surface comprises a feeder circuit comprising a transmission line and a feeder line. The second surface comprises a first open-circuit filtering branch. The transmission line is disposed on one side of the other balun supporting plate. The feeder line is disposed on the other side of the other balun supporting plate. The first open-circuit filtering branch and the feeder line are electrically connected. The baseplate is disposed on the balun supporting component and comprises a plurality of oscillator arms. The feeder lines are electrically connected with the corresponding oscillator arms respectively.

16 Claims, 12 Drawing Sheets

(51) Int. Cl.
*H01Q 1/50* (2006.01)
*H01Q 15/14* (2006.01)
*H01Q 1/24* (2006.01)
*H04W 88/08* (2009.01)

(58) Field of Classification Search
CPC .......... H04W 88/08; H04B 1/04; H04B 1/16; H04B 1/40
See application file for complete search history.

(56) References Cited

U.S. PATENT DOCUMENTS

| | | | | |
|---|---|---|---|---|
| 2012/0146871 | A1* | 6/2012 | Choi | H01Q 21/26 343/795 |
| 2017/0250462 | A1* | 8/2017 | Li | H01Q 21/26 |
| 2020/0335881 | A1* | 10/2020 | Le | H01Q 9/28 |
| 2021/0384604 | A1* | 12/2021 | Li | H01P 5/107 |

FOREIGN PATENT DOCUMENTS

| | | | |
|---|---|---|---|
| CN | 206370504 U | 6/2017 | |
| CN | 107508037 A | 12/2017 | |
| CN | 110190392 A | 8/2019 | |
| CN | 110957567 A | 4/2020 | |

\* cited by examiner

HIGH-FREQUENCY OSCILLATOR ASSEMBLY AND BASE STATION ANTENNA

CROSS-REFERENCE TO RELATED APPLICATION

This application claims the priority benefit of Chinese Patent Application Serial Number 202021519971.4, filed on Jul. 28, 2020, the full disclosure of which is incorporated herein by reference.

BACKGROUND

Technical Field

The present disclosure relates to the technical field of communication, particularly to a high-frequency oscillator assembly and a base station antenna.

Related Art

With the development of communication technology, the frequency band of communications has been significantly increased. In the case of limited base station sites, dual-polarized multi-band base station antennas have been taken a major market share of the market. For conventional dual-polarized multi-band base station antennas, high-frequency oscillators are designed to be distributed on two sides of a low-frequency oscillator. However, when the distance between high-frequency oscillators and a reflector is equal to a balun height (such as λH/4), and when the arm length of a single oscillator of the high-frequency oscillator is also equal to a balun height (such as λH/4), the high-frequency oscillator would become a monopole and produce strong radiation in a low-frequency band as the total length of the high-frequency oscillator balun and a single oscillator arm thereof is equal to a quarter of a wavelength of the center frequency point of a low-frequency oscillator. Thus, the low-frequency oscillators would have interfered, and the gaining and the direction of the low-frequency oscillators would be affected.

SUMMARY

The embodiments of the present disclosure provide a high-frequency oscillator assembly and a base station antenna to solve the problem that the strong radiation generated by conventional high-frequency oscillator assembly would interfere with low-frequency oscillators.

On the first aspect, the present disclosure provides a high-frequency oscillator assembly, comprising a balun supporting component and a baseplate. The balun supporting component comprises two balun supporting plates, one of which is assembled with the other in a cross arrangement. Each of the balun supporting plates comprises a first surface and a second surface opposite to the first surface. The first surface of each of the balun supporting plates comprises a feeder circuit comprising a transmission line and a feeder line. The second surface of each of the balun supporting plates comprises a first open-circuit filtering branch. The transmission line of each of the balun supporting plates is disposed on one side of the other balun supporting plate. The feeder line of each of the balun supporting plates is disposed on the other side of the other balun supporting plate. The first open-circuit filtering branch and the feeder line of each of the balun supporting plates are electrically connected. The baseplate is disposed on the balun supporting component and comprises a plurality of oscillator arms. The feeder lines of each of the balun supporting plates are electrically connected with the corresponding oscillator arms respectively. One ends of the transmission line and the feeder line are close to the baseplate. The horizontal distance between any point on the outermost edge of the transmission line and the other balun supporting plate is decreasing along a direction from one end of the balun supporting plate away from the baseplate toward one end of the balun supporting plate close to the baseplate.

On the second aspect, the present disclosure provides a base station antenna, comprising a reflector and a high-frequency oscillator assembly according to the first aspect. The high-frequency oscillator assembly is disposed on the reflector.

In the embodiments of the present disclosure, by disposing first open-circuit filtering branches on two balun supporting plates of the balun supporting component respectively, the high-frequency oscillator assembly would stop forming monopolar low-frequency oscillators that generate strong radiation. Thus, the high-frequency oscillator assembly used in the base station antenna could hardly interfere with the low-frequency oscillator, and the performance of the base station antenna can be effectively improved.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
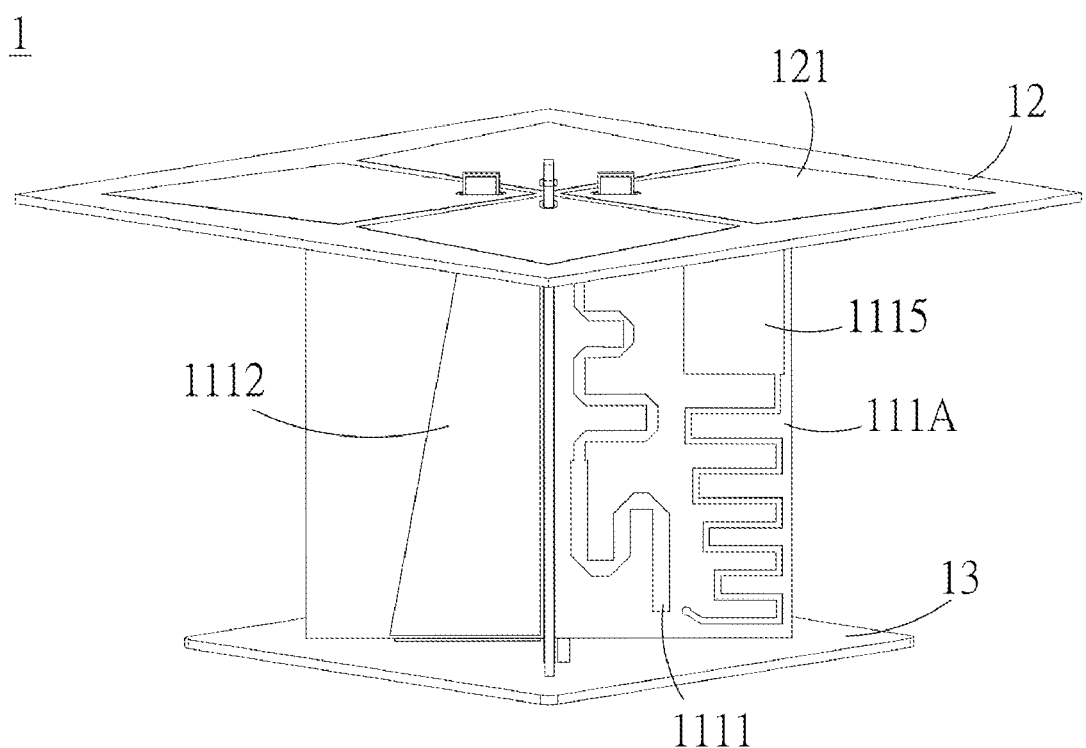
FIG. 1 is a perspective view of a high-frequency oscillator assembly of the first embodiment of the present disclosure.
Figure 2:
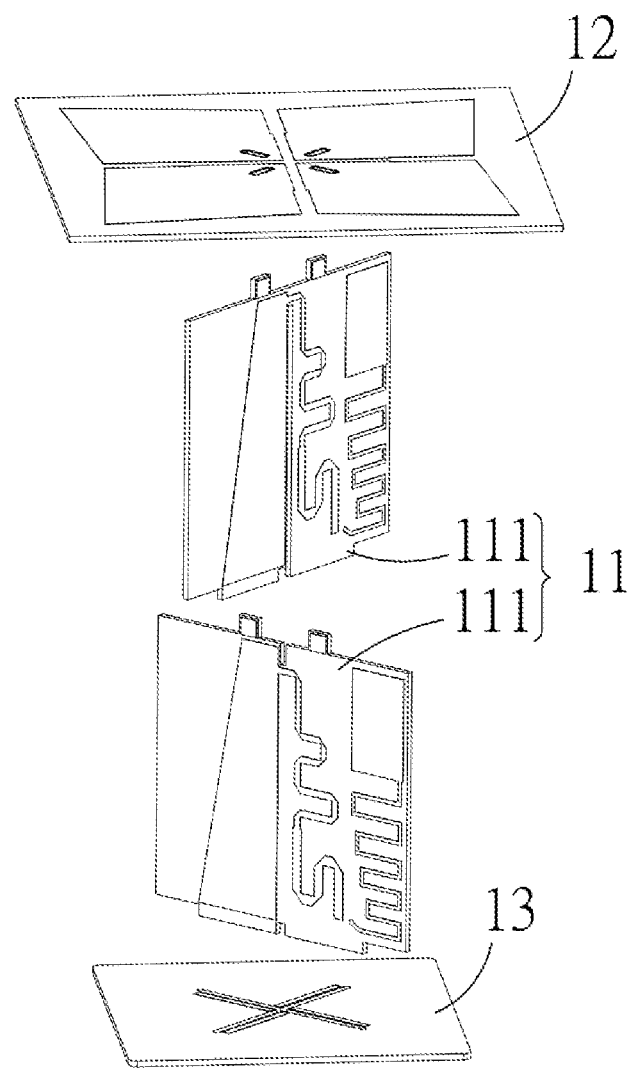
FIG. 2 is an exploded view of the high-frequency oscillator assembly of the first embodiment of the present disclosure.
Figure 3:
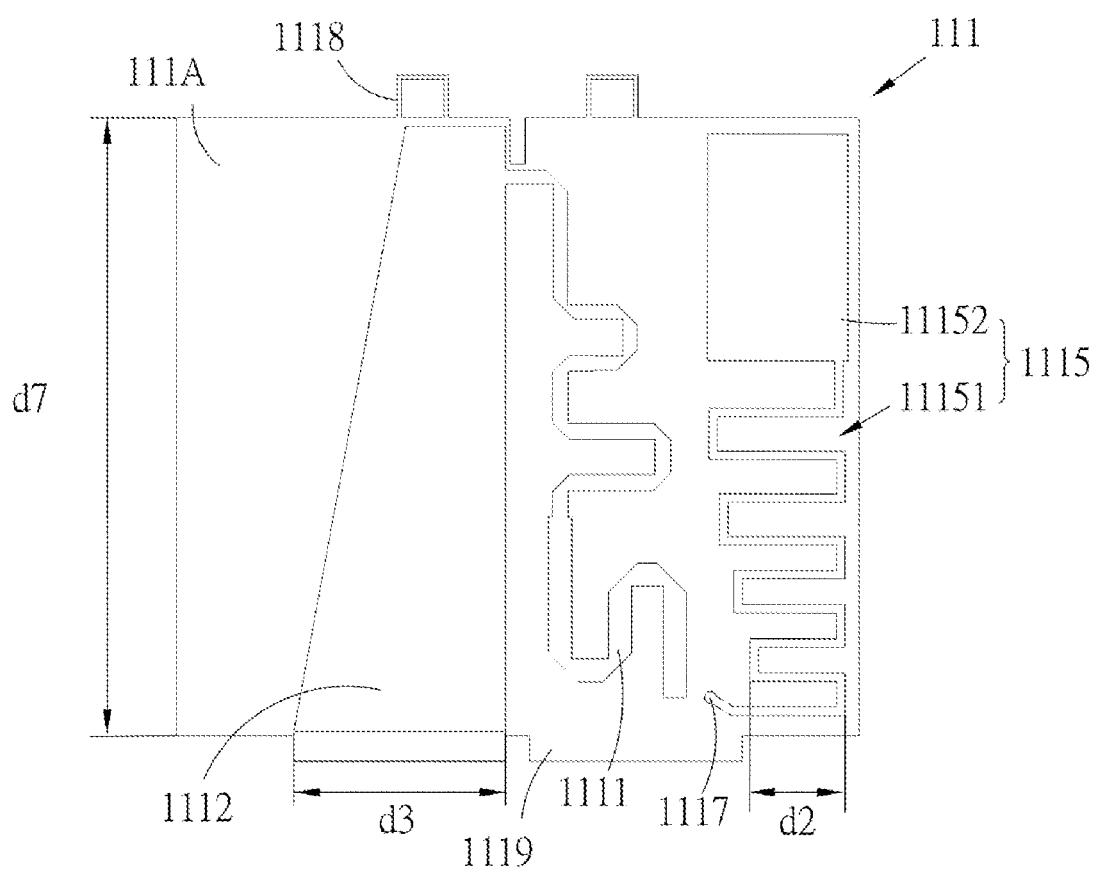
FIG. 3 is a schematic diagram of a first surface of a balun supporting plate of the first embodiment of the present disclosure.
Figure 4:
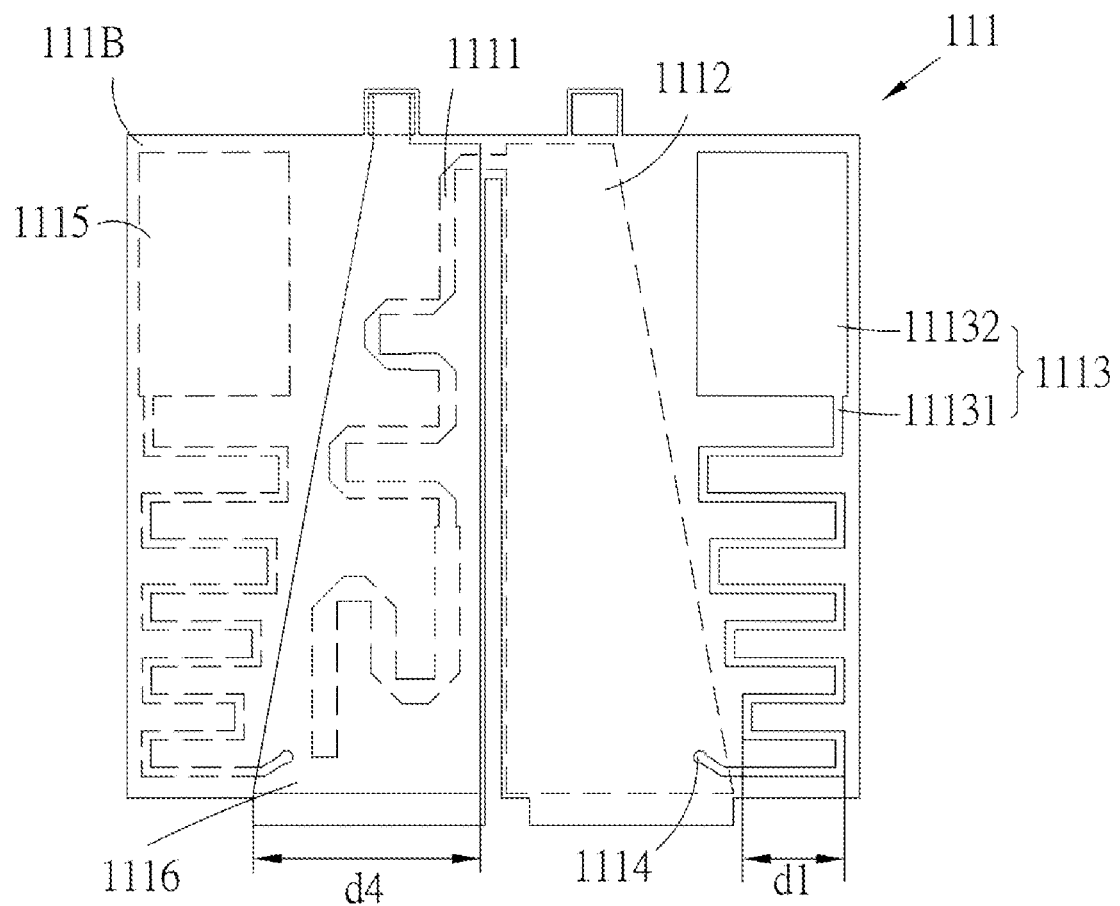
FIG. 4 is a schematic diagram of a second surface of the balun supporting plate of the first embodiment of the present disclosure.

FIG. 1 and FIG. 2 are perspective view and schematic diagram of a high-frequency oscillator assembly of the first embodiment of the present disclosure. FIG. 3 are schematic diagram of a first surface of a balun supporting plate of the first embodiment of the present disclosure. FIG. 4 is a schematic diagram of a second surface of the balun supporting plate of the first embodiment of the present disclosure. As shown in the figures, the present disclosure provides a high-frequency oscillator assembly 1, comprising a balun supporting component 11 and a baseplate 12. The balun supporting component 11 comprises two balun supporting plates 111, one of which is assembled with the other in a cross arrangement. The balun supporting plate 111 can be a printed circuit board. Each of the balun supporting plates 111 comprises a first surface 111A and a second surface 111B opposite to the first surface 111A. The first surface 111A of each of the balun supporting plates 111 comprises a feeder circuit comprising a transmission line 1111 and a feeder line 1112. The second surface 111B of each of the balun supporting plates 111 comprises a first open-circuit filtering branch 1113. The transmission line 1111 of each of the balun supporting plates 111 is disposed on one side of the other balun supporting plate 111. The feeder line 1112 of each of the balun supporting plates 111 is disposed on the other side of the other balun supporting plate 111. Specifically, as shown in FIG. 3, looking toward the first surface 111A, each of the balun supporting plates 111 is divided into a left side and a right side by the other balun supporting plate 111. The transmission line 1111 is disposed on the right side of the first surface 111A, and the feeder line 1112 is disposed on the left side of the first surface 111A. As shown in FIG. 4, the backside on the left side of the first surface 111A is the right side of the second surface 111B, and the first open filtering branch 1113 is disposed on the right side of the second surface 111B. The transmission line 1111 is electrically connected to the feeder line 1112, and the first open-circuit filtering branch 1113 is electrically connected to the feeder line 1112 through the first hole 1114. The baseplate 12 is disposed on the balun supporting component 11 and comprises a plurality of oscillator arms 121. The feeder lines 1112 of each of the balun supporting plates 111 are electrically connected with the corresponding oscillator arms 121 respectively.

In this embodiment, one end of the transmission line 1111 and one end of the feeder line 1112 are close to the baseplate 12. The horizontal distance between any point on the outermost edge of the transmission line 1111 and the other balun supporting plate 111 is decreasing along a direction from one end of the balun supporting plate 111 away from the baseplate 12 toward one end of the balun supporting plate 111 close to the baseplate 12. The wiring details of the transmission line 1111 would be explained in detail hereinafter. By disposing the first open-circuit filtering branches 1113 on two balun supporting plates 111 of the balun supporting component 11 respectively, the high-frequency oscillator assembly 1 would stop forming monopolar low-frequency oscillators that generate strong radiation. Thus, the high-frequency oscillator assembly 1 used in the base station antenna could hardly interfere with the low-frequency oscillator, and the performance of the base station antenna can be effectively improved.

In one embodiment, the first surface 111A of each of the balun supporting plates 111 comprises a second open-circuit filtering branch 1115. The second surface 111B comprises a balun circuit 1116. The second open-circuit filtering branch 1115 is disposed on the same side of the balun circuit 1116. Specifically, as shown in FIG. 4, looking towards the second surface 111B, the balun supporting plate 111 is divided into a left side and a right side by the other balun supporting plate 111. The balun circuit 1116 is disposed on the left side of the second surface 111B, and the second open-circuit filtering branch 1115 is disposed on the right side of the first surface 111A so that the backside of the left side of the second surface 111B is the right side of the first surface 111A. Thus, the second open-circuit filtering branch 1115 is disposed on the same side as the balun circuit 1116. Furthermore, the second open-circuit filtering branch 1115 on the first surface 111A is electrically connected with the balun circuit 1116 on the second surface 111B through a second hole 1117 of the balun supporting plate 111. The balun circuit 1116 is electrically connected with the corresponding oscillator arm 121.

In one embodiment, as shown in FIG. 4, the first open-circuit filtering branch 1113 comprises a first transmission section 11131 and a first filtering section 11132. One end of the first transmission section 11131 is electrically connected with the feeder line 1112 through the first hole 1114. The first filtering section 11132 is connected with the other end of the first transmission section 11131. As shown in FIG. 3, the second open-circuit filtering branch 1115 comprises a second transmission section 11151 and a second filtering section 11152. One end of the second transmission section 11151 is electrically connected to the balun circuit 1116 through the second hole 1117. The second filtering section 11152 is connected to the other end of the second transmission section 11151. In this embodiment, the first transmission section 11131 and the second transmission section 11151 are bent. The horizontal width d1 of the first transmission section 11131 is decreasing along a direction from one end of the balun supporting plate 111 close to the baseplate 12 toward one end of the balun supporting plate 111 away from the baseplate 12. The horizontal width d2 of the second transmission section 11151 is decreasing along the direction from one end of the balun supporting plate 111 close to the baseplate 12 toward one end of the balun supporting plate 111 away from the baseplate 12.

The distance between any point on an edge of the feeder line 1112 of each of the balun supporting plates 111 away from the centerline of the base plate 12 and the other balun supporting plate 111 is referred as the horizontal width d3. The horizontal width d3 is decreasing along a direction from one end of the balun supporting plate 111 away from the baseplate 12 toward one end of the balun supporting plate 111 close to the baseplate 12. Similarly, the distance between any point on an edge of the balun circuit 1116 of each of the balun supporting plates 111 away from the centerline of the base plate 12 and the other balun supporting plate 111 is referred as the horizontal width d4. The horizontal width d4 is decreasing along the direction from one end of the balun supporting plate 111 away from the baseplate 12 toward one end of the balun supporting plate 111 close to the baseplate 12. In this embodiment, the edge of the feeder line 1112 and the edge of the balun circuit 1116 away from the center of the baseplate 12 are straight lines. In other embodiments, the edge of the feeder line 1112 and the edge of the balun circuit 1116 away from the center of the baseplate 12 can also be step-shaped. That is, this embodiment does not limit the side pattern on one side of the feeder line 1112 and the balun circuit 1116 away from the center of the baseplate 12. As long as the line width of the feeder line 1112 and the balun circuit 1116 decreases along the direction from one end of the balun supporting plate 111 away from the baseplate 12 to one end of the balun supporting plate 111 close to the baseplate 12, the effect of this embodiment can be achieved.

Figure 5:
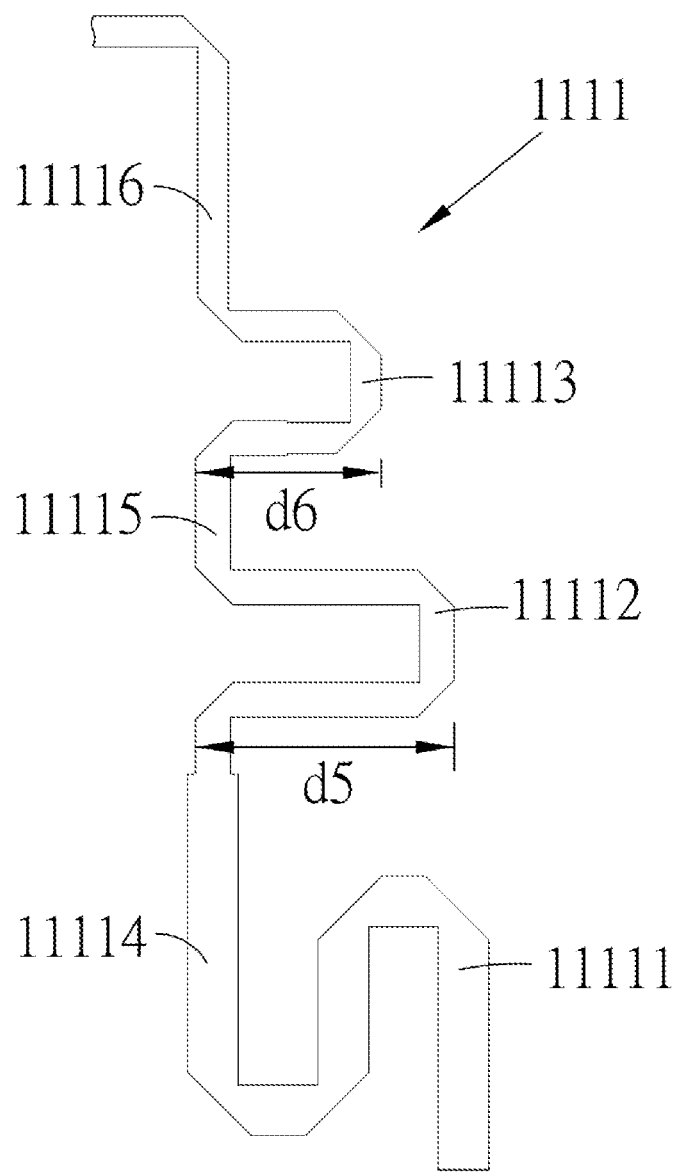
FIG. 5 is a schematic diagram of a transmission line of the first embodiment of the present disclosure.

FIG. 5 is a schematic diagram of a transmission line of the first embodiment of the present disclosure. As shown in the figure, the transmission line 1111 of each of the balun supporting plates 111 comprises a plurality of microstrip lines and a plurality of connecting lines. The plurality of microstrip lines are alternately connected with the plurality of connecting lines. Each of the microstrip lines is bent. In this embodiment, the plurality of microstrip lines comprise a first microstrip line 11111, a second microstrip line 11112, and a third microstrip line 11113. The plurality of connecting lines comprise a first connecting line 11114, a second connecting line 11115, and a third connecting line 11116 The first microstrip line 11111, the first connecting line 11114, the second microstrip line 11112, the second connecting line 11115, the third microstrip line 11113, and the third connecting line 11116 are connected in series in order. The first microstrip line 11111 is farther than the third microstrip line 11113 from the baseplate 12. The bending direction of the first microstrip line 11111 is different from the bending direction of the second microstrip line 11112. The bending direction of the second microstrip line 11112 and the bending direction of the third microstrip line 11113 are the same. The two wirings of the first microstrip line 11111 extending in opposite directions are extending vertically upward and vertically downward. The extending direction of a bent wiring connected between the two opposite wirings is bent from the upward direction to the downward direction in 180 degrees. In this way, the bending direction or the opening direction formed by bending of the first microstrip line 11111 is facing downward. The two wirings of the second microstrip line 11112 extending in opposite directions are extending horizontally to the right and to the left. The extending direction of a bent wiring connected between the two opposite wirings is bent from the right direction to the left direction in 180 degrees. In this way, the bending direction or the opening direction formed by bending of the second microstrip line 11112 is facing to the left. In the case of the third microstrip line 11113, as it is similar to the second microstrip line 11112, the bending direction or the opening direction formed by bending of the third microstrip line 11113 is also facing to the left. In this embodiment, the vertical distance between the two wirings of the second microstrip line 11112 that extend in opposite directions is smaller than the vertical distance between the two wirings of the third microstrip line 11113 that extend in opposite directions. The horizontal extension length d5 of the two wirings of the second microstrip line 11112 that extend in opposite directions (or the horizontal width of the second microstrip line 11112) is greater than the horizontal extension length d6 of the two wirings of the third microstrip line 11113 that extend in opposite directions (or the horizontal width of the third microstrip line 11113), but it is not limited thereto. In this embodiment, the line width of the wiring of the first microstrip line 11111 (the thickness of the wiring) is wider than the width of the wiring of the second microstrip line 11112 and the width of the wiring of the third microstrip line 11113, but it is not limited thereto.

Thus, the bending direction or the opening direction of the first microstrip line 11111 is different from that of the second microstrip line 11112, and the bending direction or the opening direction of the second microstrip line 11112 is the same as that of the third microstrip line 11113. The first microstrip line 11111 is invertely U-shaped that opens downward, and the second microstrip line 11112 and the third microstrip line 11113 are invertely C-shaped that opens to the left. The first microstrip line 11111 and the second microstrip line 11112 are connected through a L-shaped component of the first connecting line 11114, the second microstrip line 11112 and the third microstrip line 11113 are connected through an in-line-shaped component of the second connecting line 11115, and the third microstrip line 11113 and the feeder line 1112 are connected through a L-shaped component that is upside down and also laterally reversed of the third connecting line 11116.

Figure 6:
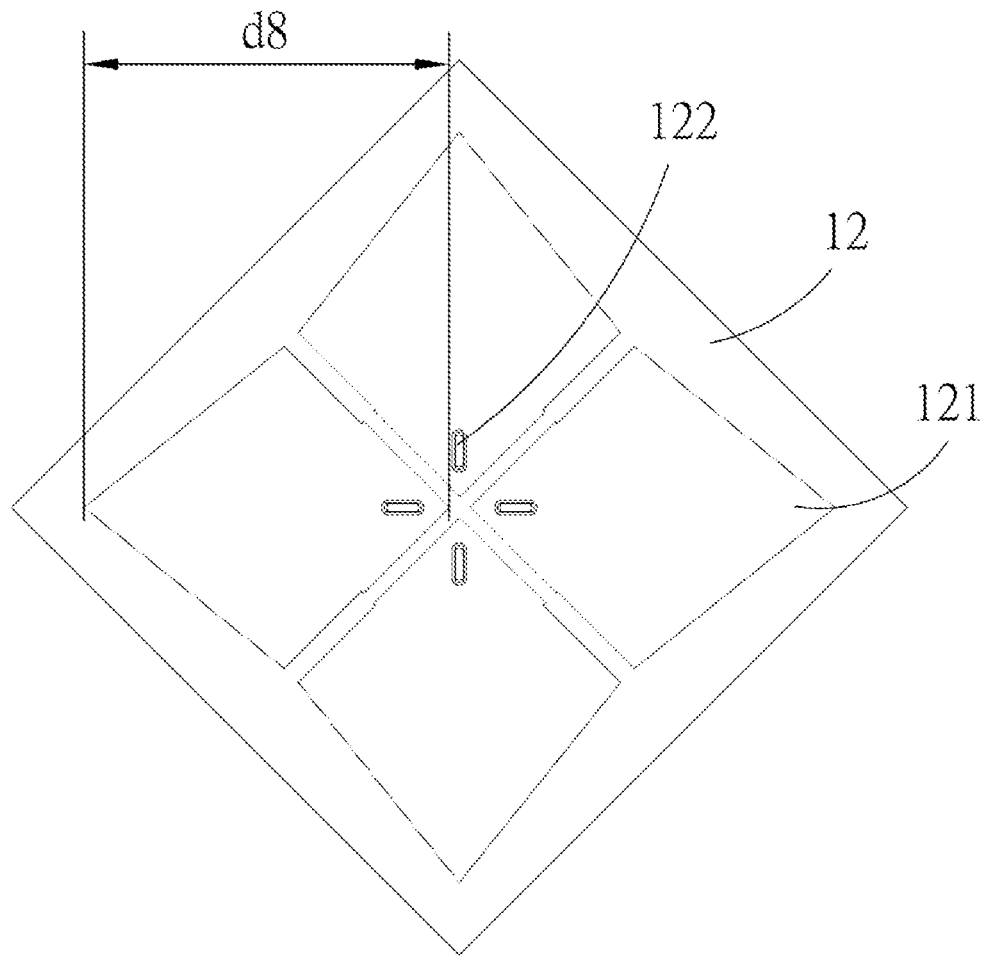
FIG. 6 is a schematic diagram of a baseplate of the first embodiment of the present disclosure.

FIG. 6 is a schematic diagram of a baseplate of the first embodiment of the present disclosure. As shown in the figure, in this embodiment, the baseplate 12 could be a printed circuit board. The baseplate 12 comprises a feeder through hole 122 penetrating one end of the oscillator arm 121 close to the center of the baseplate 12, which indicates that the feeder through hole 122 is adjacent to the center of the baseplate 12 without been disposed on the center of the baseplate 12. The feeder through hole 122 can be in a shape of oval or rectangular. Back to FIG. 3, each of the balun supporting plates 111 comprises two feeder bumps 1118 corresponding to the feeder through hole 122. Thus, the two balun supporting plates 111 comprise four feeder bumps 1118 in total, so the number of feeder through holes 122 corresponding to the feeder bumps 1118 is also four. The feeder line 1112 and the balun circuit 1116 respectively extend to a surface of the corresponding feeder bump 1118. By passing the feeder bump 1118 through the feeder through hole 122 to secure the baseplate 12 and the balun supporting component 11, the feeder line 1112 and the balun circuit 1116 can be connected to the corresponding oscillator arms 121.

Figure 7:
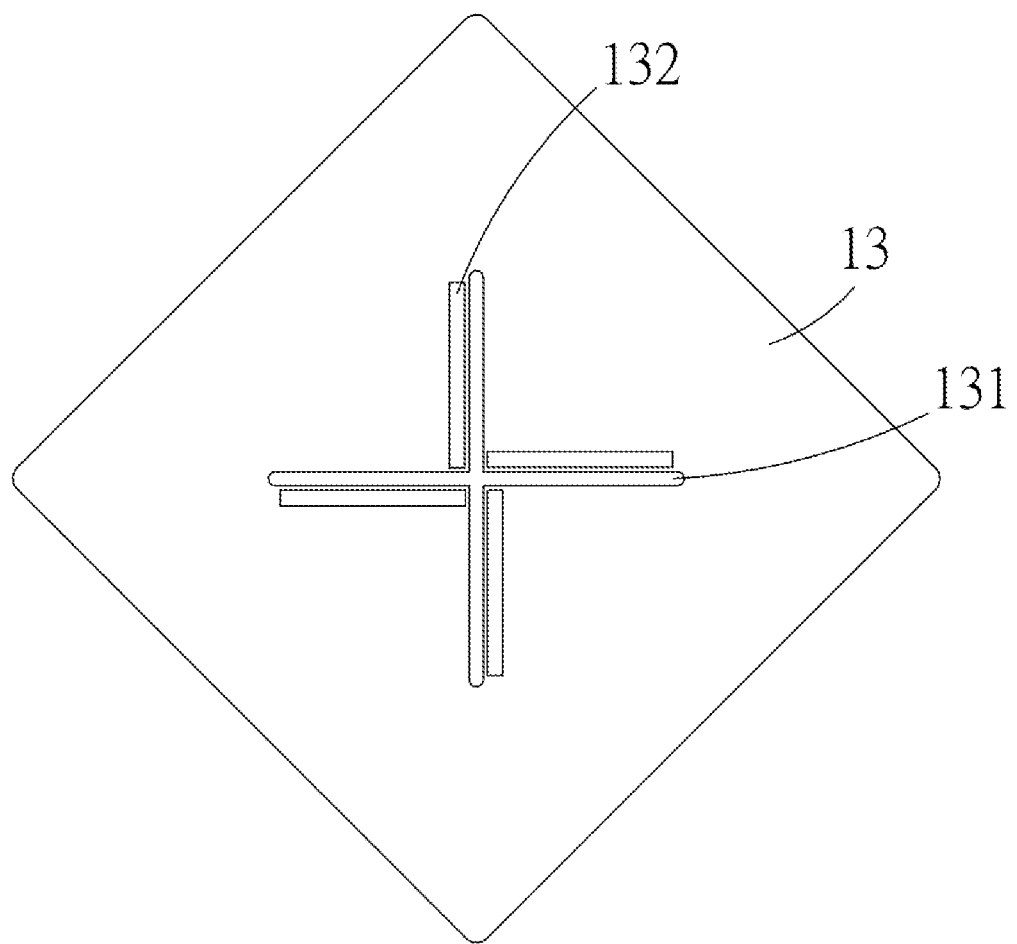
FIG. 7 is a schematic diagram of a feeder board of the first embodiment of the present disclosure.

FIG. 7 is a schematic diagram of a feeder board of the first embodiment of the present disclosure. As shown in the figure, in this embodiment, the high-frequency oscillator assembly 1 further comprises a feeder board 13. The feeder board 13 is disposed at one end of the balun supporting component 11 away from the baseplate 12, and is electrically connected with the feeder line 1112 of each of the balun supporting plates 111. Specifically, the feeder board 13 is provided with a feeder groove 131 and a plurality of grounding parts 132. The feeder groove 131 is disposed on the center of the feeder board 13 in a cross arrangement. Back to FIG. 3, each of the balun supporting plates 111 further comprises two feeder engaging parts 1119. The feeder engaging part 1119 is engaged with the feeder groove 131 to secure the balun supporting plate 111 on the feeder board 13. The plurality of grounding parts 132 are respectively electrically connected with the feeder line 1112 and the balun circuit 1116 to ground the current generated by the surge or lightning on the baseplate 12 and the balun supporting component 11. In this embodiment, the tallness d7 of each of the balun supporting plates 111 is equal to a quarter of the wavelength of the working frequency band of the high-frequency oscillator assembly 1. The plurality of the oscillator arms 121 are arranged in a ring shape around the center of the baseplate 12. The length d8 between one end of each of the oscillator arms 121 close to the baseplate 12 and one end of each of the oscillator arms 121 away from the baseplate 12 is equal to a quarter of the wavelength of the working frequency band of the high-frequency oscillator assembly 1. Specifically, the working frequency band of the high-frequency oscillator assembly 1 is between 1.425 GHz and 2.69 GHz. Thus, the quarter of the corresponding wavelength of the frequency band between 1.425 GHz and 2.69 GHz would be between 52 mm and 28 mm. In other words, the tallness d7 of the balun supporting plate 111 and the length d8 of the oscillator arm 121 can be designed with reference to the value or the interval for actual application. However, this application is not only limited to the working frequency band between 1.425 GHz and 2.69 GHz. In other embodiments, the tallness d7 of the balun supporting plate 111 and the length d8 of the oscillator arm 121 can also be adjusted for different working frequency bands. Besides, each of the oscillator arms 121 can be in a shape of diamond, rectangle, or circle. That is, the oscillator arm 121 can be adjusted according to actual requirements. As long as the length d8 of the oscillator arm 121 is equal to a quarter of the wavelength of the working frequency band of the high-frequency oscillator assembly, the expected effect of this embodiment can be achieved.

Figure 8:
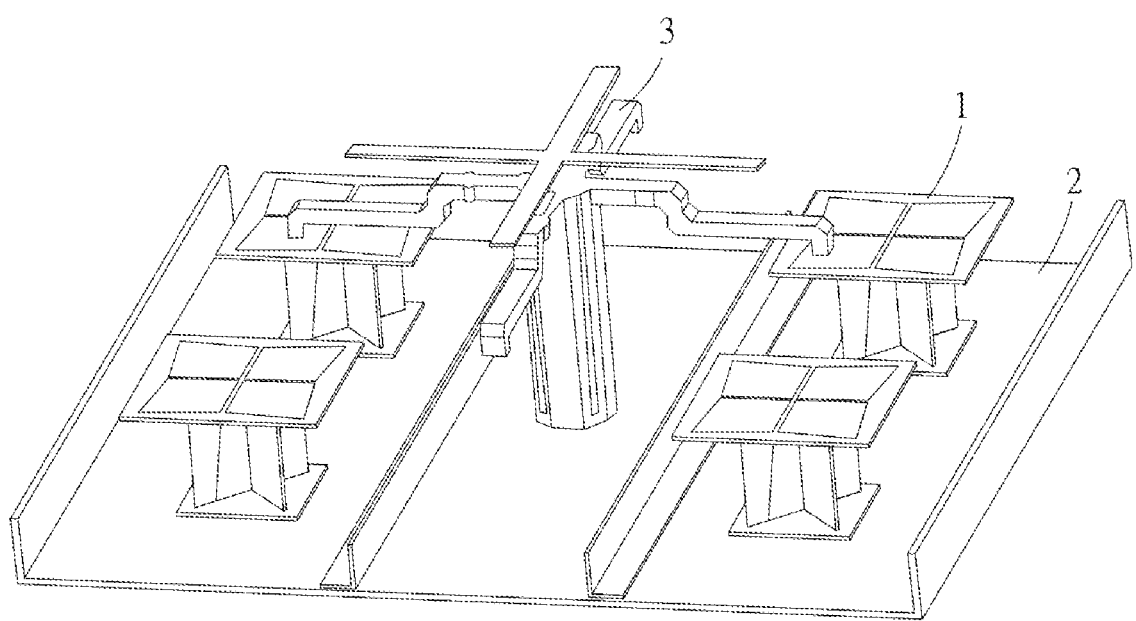
FIG. 8 is a schematic diagram of a base station antenna of the second embodiment of the present disclosure.

FIG. 8 is a schematic diagram of a base station antenna of the second embodiment of the present disclosure. As shown in the figure, the base station antenna comprises a high-frequency oscillator assembly 1 according to the above embodiment and a reflector 2. The high-frequency oscillator assembly 1 is disposed on the reflector 2. Specifically, four high-frequency oscillator assemblies 1 are surrounding one low-frequency oscillator assembly 3 at the center in actual application. The reflector 2 reflects the signal radiated from the high-frequency oscillator assembly 1 or the low-frequency oscillator assembly 3. When the reflected signal is superimposed with the unreflected signal, the entire signal can be further enhanced. The reflector 2 can be a printed circuit board or a metal material, which is configured based on actual usage.

Figure 9:
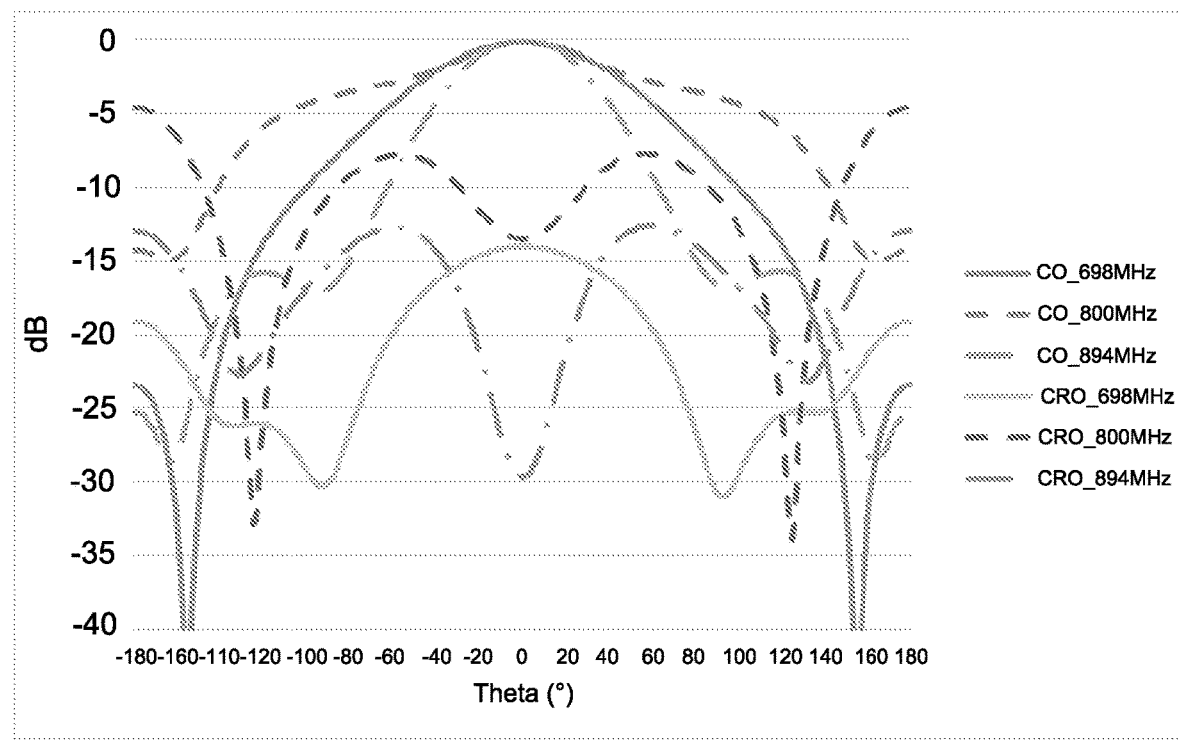
FIG. 9 is a graph of radiation pattern of a low-frequency oscillator assembly of a comparative example of the present disclosure.
Figure 10:
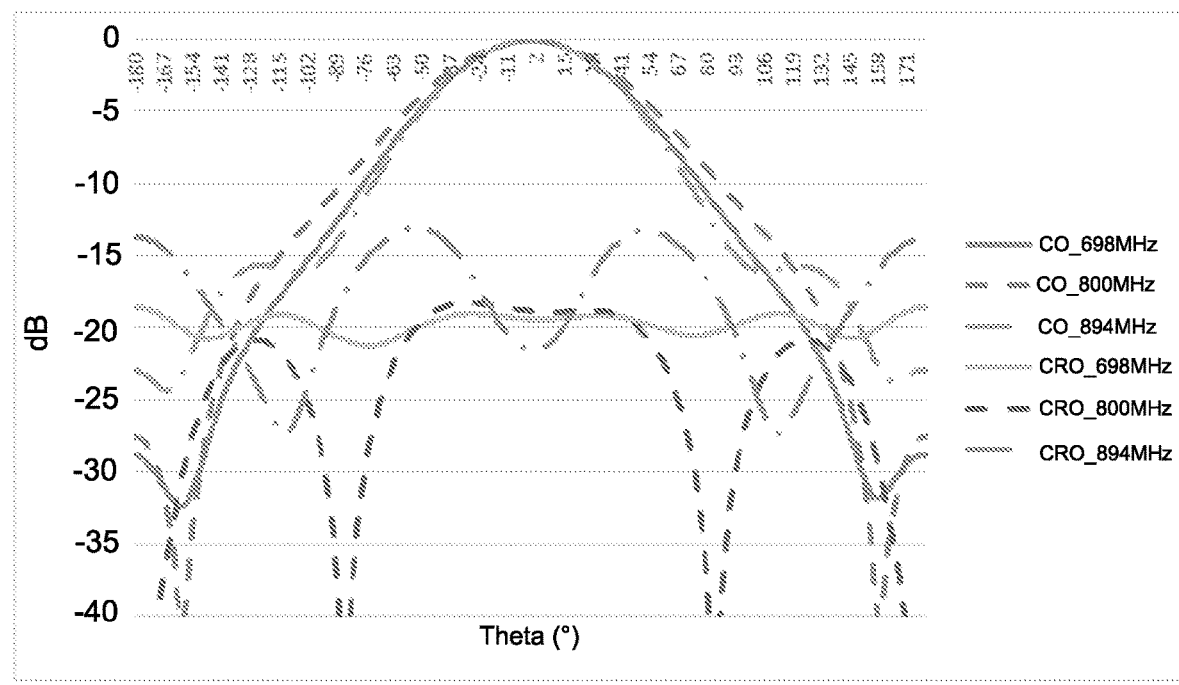
FIG. 10 is a graph of radiation pattern of a low-frequency oscillator assembly of the second embodiment of the present disclosure.
Figure 11:
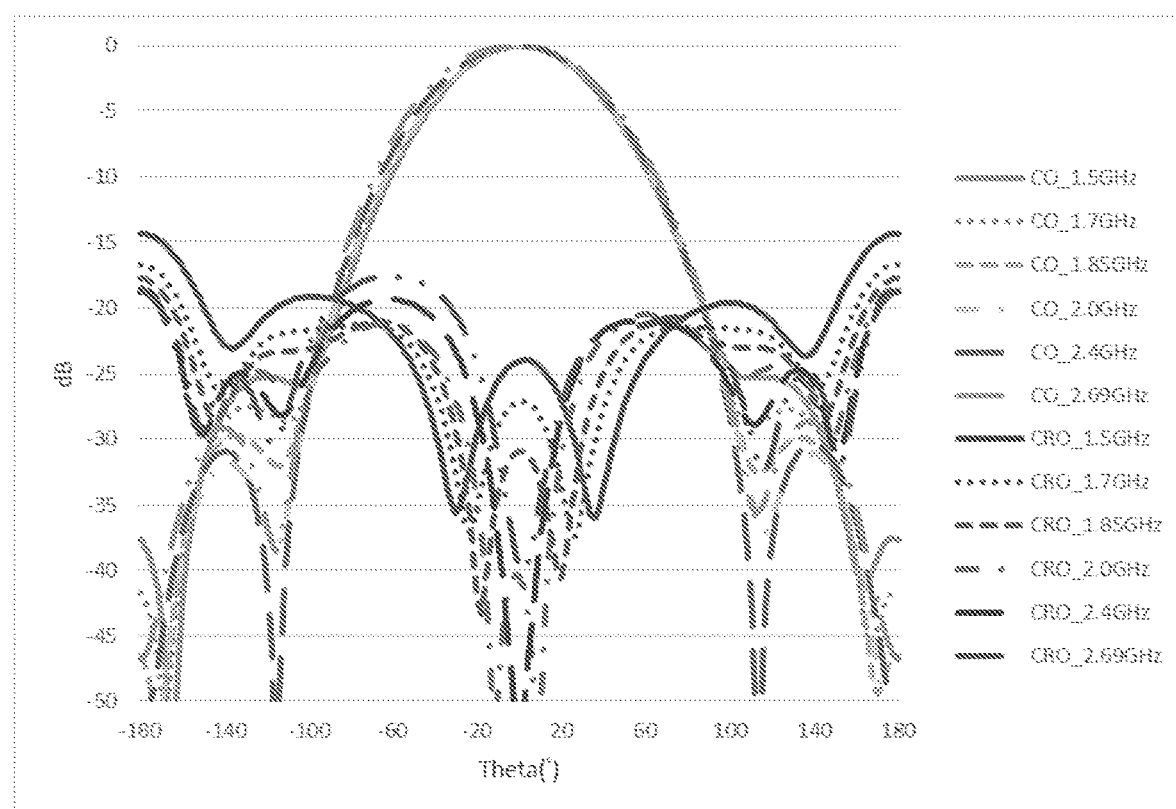
FIG. 11 is a graph of radiation pattern of a high-frequency oscillator assembly of the second embodiment of the present disclosure.
Figure 12:
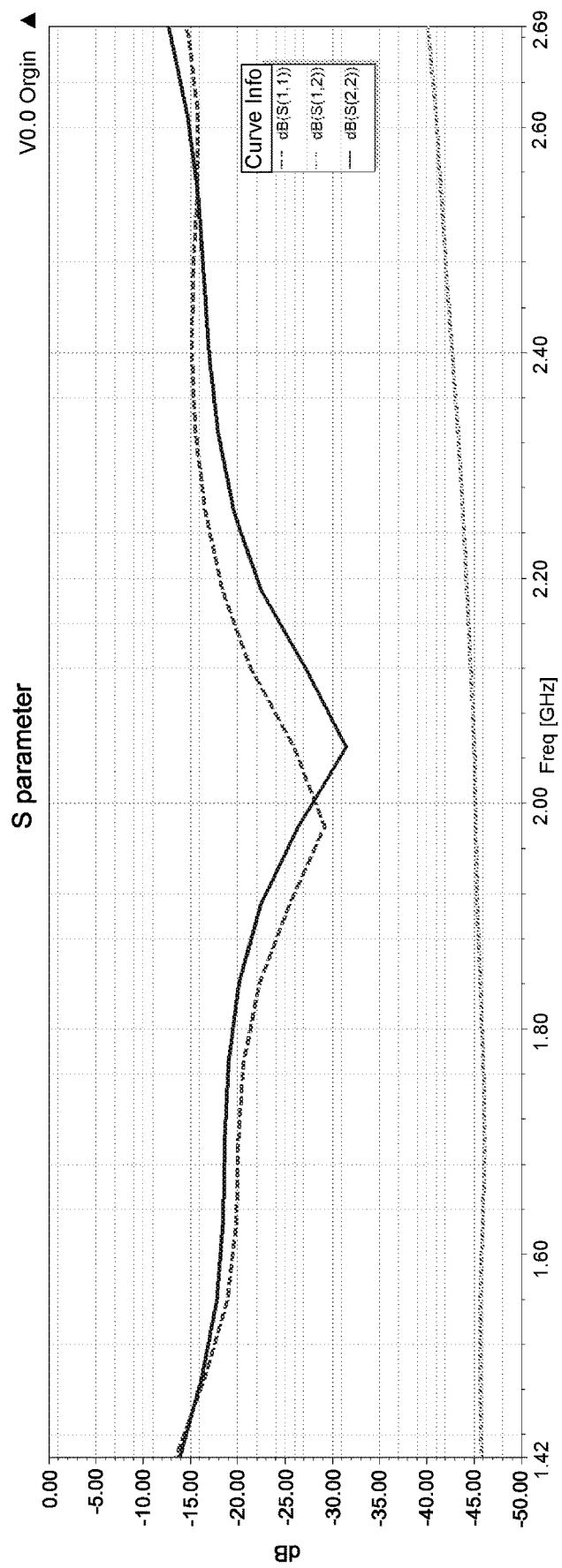
FIG. 12 is a graph of return loss of the high-frequency oscillator assembly of the second embodiment of the present disclosure.

To further illustrate the effectiveness of the base station antenna of the present disclosure, please refer to FIG. 9 to FIG. 12. FIG. 9 is a graph of radiation pattern of a low-frequency oscillator assembly of a comparative example of the present disclosure. FIG. 10 is a graph of radiation pattern of a low-frequency oscillator assembly of the second embodiment of the present disclosure. FIG. 11 is a graph of radiation pattern of a high-frequency oscillator assembly of the second embodiment of the present disclosure. FIG. 12 is a graph of return loss of the high-frequency oscillator assembly of the second embodiment of the present disclosure. As shown in FIG. 9, when conventional high-frequency oscillator assembly is not provided with an open-circuit filtering branch, it would interfere with the low-frequency oscillator assembly 3 to distort the beam of the low-frequency oscillator assembly 3. The graph of radiation pattern of a low-frequency oscillator assembly 3 shows that, in the range between 104 and 140 degrees, the performance seriously deteriorates as the cross-polarization is only −13 dB and the front-to-back ratio is −12 dB. As shown in FIG. 10, when using the high-frequency oscillator assembly 1 of the present disclosure, i.e., when using the high-frequency oscillator assembly 1 with open-circuit filtering branches, the beam distortion of the low-frequency oscillator assembly 3 can be effectively reduced. The graph of radiation pattern of a low-frequency oscillator assembly 3 shows that the beam of the low-frequency oscillator assembly 3 converges at the range between 72 and 82 degrees, the cross-polarization is −19 dB, and the front-to-back ratio is −24 dB. Thus, it is obvious that the high-frequency oscillator assembly 1 with open-circuit filtering branches significantly improves the performance of the low-frequency oscillator assembly 3.

As shown in FIG. 11, the 1.5 GHz, 1.7 GHz, 1.85 GHz, 2.0 GHz, 2.4 GHz, and 2.69 GHz are taken from the frequency band of 1.42 GHz to 2.69 GHz to perform a test on the radiation pattern of the high-frequency oscillator assembly 1. The results show that the 3 dB beamwidth is 67 to 78 degrees, the front-to-rear ratio is less than −30 dB, the spindle cross-polarization is greater than 24 dB, and the ±60 cross-polarization is greater than 11 dB, which indicates that the beamwidth of the oscillator is convergent with excellent cross-polarization. Such high-frequency oscillator assembly 1 would have excellent overall performance capable of being used in multiple wireless applications. As shown in FIG. 12, the high-frequency oscillator assembly 1 comprises a return loss of less than −13 dB in the 1.42 GHz to 2.69 GHz frequency band range, showing the characteristics of ultra-wideband.

In summary, embodiments of the present disclosure provide a high-frequency oscillator assembly and a base station antenna. By disposing first open-circuit filtering branches on two balun supporting plates of the balun supporting component respectively, the high-frequency oscillator assembly would stop forming monopolar low-frequency oscillators that generate strong radiation. Thus, the high-frequency oscillator assembly used in the base station antenna could hardly interfere with the low-frequency oscillator, and the performance of the base station antenna can be effectively improved.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . ." does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A high-frequency oscillator assembly, comprising:
   a balun supporting component comprising two balun supporting plates, one of which being assembled with the other in a cross arrangement, each of the balun supporting plates comprising a first surface and a second surface opposite to the first surface, the first surface of each of the balun supporting plates comprising a feeder circuit comprising a transmission line and a feeder line, the second surface of each of the balun supporting plates comprising a first open-circuit filtering branch, the transmission line of each of the balun supporting plates being disposed on one side of the other balun supporting plate, the feeder line of each of the balun supporting plates being disposed on the other side of the other balun supporting plate, the first open-circuit filtering branch and the feeder line of each of the balun supporting plates being electrically connected; and
   a baseplate disposed on the balun supporting component, comprising a plurality of oscillator arms, the feeder lines of each of the balun supporting plates being electrically connected with the corresponding oscillator arms respectively;
   wherein one ends of the transmission line and the feeder line are close to the baseplate; the horizontal distance between any point on the outermost edge of the transmission line and the other balun supporting plate is decreasing along a direction from one end of the balun supporting plate away from the baseplate toward one end of the balun supporting plate close to the baseplate.

2. The high-frequency oscillator assembly according to claim 1 further comprising a feeder board, the feeder board being disposed at one end of the balun supporting component away from the baseplate, and being electrically connected with the feeder circuit of each of the balun supporting plates.

3. The high-frequency oscillator assembly according to claim 2, wherein the first open-circuit filtering branch is electrically connected to the feeder circuit through a first hole.

4. The high-frequency oscillator assembly according to claim 2, wherein the first surface of each of the balun supporting plates comprises a second open-circuit filtering branch; the second surface of each of the balun supporting plates comprises a balun circuit; the second open-circuit filtering branch is disposed on the same side of the balun circuit; the second open-circuit filtering branch is electrically connected with the balun circuit; the balun circuit is electrically connected with the corresponding oscillator arm.

5. The high-frequency oscillator assembly according to claim 4, wherein the first open-circuit filtering branch and the second open-circuit filtering branch respectively comprise a transmission section and a filtering section; one end of the transmission section is electrically connected with the feeder circuit; the filtering section is connected with the other end of the transmission section.

6. The high-frequency oscillator assembly according to claim 5, wherein the transmission section is bent.

7. The high-frequency oscillator assembly according to claim 4, wherein the baseplate comprises a feeder through hole penetrating one end of the oscillator arm close to the center of the baseplate; each of the balun supporting plates comprises two feeder bumps; the feeder line and the balun circuit respectively extend to a surface of the corresponding feeder bumps; the feeder bump passes through the feeder through hole; the feeder line and the balun circuit are connected to the corresponding oscillator arm.

8. The high-frequency oscillator assembly according to claim 4, wherein the horizontal width between any point on an edge of the feeder line of each of the balun supporting plates away from the center of the baseplate is decreasing along the direction from one end of the balun supporting plate away from the baseplate toward one end of the balun supporting plate close to the baseplate; the horizontal width between any point on an edge of the balun circuit of each of the balun supporting plates away from the center of the baseplate and the other balun supporting plate is decreasing along the direction from one end of the balun supporting plate away from the baseplate toward one end of the balun supporting plate close to the baseplate.

9. The high-frequency oscillator assembly according to claim 8, wherein the edges of the feeder line and the balun circuit away from the center of the baseplate are respectively in a shape of straight or stepped.

10. The high-frequency oscillator assembly according to claim 1, wherein the transmission line comprises a plurality of microstrip lines and a plurality of connecting lines; the plurality of microstrip lines are alternately connected with the plurality of connecting lines; each of the microstrip lines is bent.

11. The high-frequency oscillator assembly according to claim 10, wherein the plurality of microstrip lines comprise a first microstrip line, a second microstrip line, and a third microstrip line; the plurality of connecting lines comprise a first connecting line, a second connecting line, and a third connecting line; the first microstrip line, the first connecting line, the second microstrip line, the second connecting line, the third microstrip line, and the third connecting line are connected in series in order; the first microstrip line is farther than the third microstrip line from the baseplate; the bending direction of the first microstrip line is different from the bending direction of the second microstrip line; the bending direction of the second microstrip line and the bending direction of the third microstrip line are the same.

12. The high-frequency oscillator assembly according to claim 1, wherein the tallness of each of the balun supporting plates is equal to a quarter of a wavelength of a working frequency band of the high-frequency oscillator assembly.

13. The high-frequency oscillator assembly according to claim 12, wherein the plurality of the oscillator arms are arranged in a ring shape around the center of the baseplate;

the length between one end of each of the oscillator arms close to the baseplate and one end of each of the oscillator arms away from the baseplate is equal to a quarter of the wavelength of the working frequency band of the high-frequency oscillator assembly.

14. The high-frequency oscillator assembly according to claim 12, wherein the working frequency band of the high-frequency oscillator assembly is between 1.425 GHz and 2.69 GHz.

15. The high-frequency oscillator assembly according to claim 13, wherein the working frequency band of the high-frequency oscillator assembly is between 1.425 GHz and 2.69 GHz.

16. A base station antenna, comprising:
a reflector; and
a high-frequency oscillator assembly, comprising:
  a balun supporting component comprising two balun supporting plates, one of which being assembled with the other in a cross arrangement, each of the balun supporting plates comprising a first surface and a second surface opposite to the first surface, the first surface of each of the balun supporting plates comprising a feeder circuit comprising a transmission line and a feeder line, the second surface of each of the balun supporting plates comprising a first open-circuit filtering branch, the transmission line of each of the balun supporting plates being disposed on one side of the other balun supporting plate, the feeder line of each of the balun supporting plates being disposed on the other side of the other balun supporting plate, the first open-circuit filtering branch and the feeder line of each of the balun supporting plates being electrically connected; and
  a baseplate disposed on the balun supporting component, comprising a plurality of oscillator arms, the feeder lines of each of the balun supporting plates being electrically connected with the corresponding oscillator arms respectively;
  wherein one ends of the transmission line and the feeder line are close to the baseplate; the horizontal distance between any point on the outermost edge of the transmission line and the other balun supporting plate is decreasing along a direction from one end of the balun supporting plate away from the baseplate toward one end of the balun supporting plate close to the baseplate;
wherein the high-frequency oscillator assembly is disposed on the reflector.

* * * * *